United States Patent [19]
Ohta et al.

[11] Patent Number: 5,224,050
[45] Date of Patent: Jun. 29, 1993

[54] METHOD FOR DETECTING THE COORDINATE POSITION OF THE GRINDING POINT OF A GRINDING WHEEL AND RELATED DEVICE

[75] Inventors: Norio Ohta, Okazaki; Yoshio Wakazono, Nagoya, both of Japan

[73] Assignee: Toyoda Koki Kabushiki Kaisha, Kariya, Japan

[21] Appl. No.: 554,419

[22] Filed: Jul. 19, 1990

[30] Foreign Application Priority Data

Jul. 21, 1989 [JP] Japan ................... 1-189818

[51] Int. Cl.$^5$ ............................ B24B 49/00
[52] U.S. Cl. ..................... 364/474.06; 51/165.71; 51/165.87
[58] Field of Search ........... 364/474.06; 51/165.71, 51/165.77, 165.87, 165.88

[56] References Cited

U.S. PATENT DOCUMENTS 4,084,243 4/1978 Kishi et al. ............... 364/474.06
4,709,509 12/1987 Yoneda et al. .............. 51/165.71

FOREIGN PATENT DOCUMENTS 0200788 11/1986 European Pat. Off.

Primary Examiner—Jerry Smith
Assistant Examiner—Patrick D. Muir
Attorney, Agent, or Firm—Oblon, Spivak, McClelland, Maier & Neustadt

[57] ABSTRACT

A method for detecting the coordinate position of the grinding point of a grinding wheel supported on a swiveling table comprises the steps of: rotating drivably the swiveling table through a specified angle from a start position so as to arrive at a first turning position; measuring a first displacement of the grinding point of the grinding wheel from the start position by displacement measuring means; rotating the swiveling table through the specified angle from the first turning position so as to arrive at a second turning position; measuring a second displacement of the grinding point of the griding wheel from the first turning position by the displacement measuring means; and calculating the position of the grinding wheel with respect to the swivel axis of swiveling table according to the first and the second displacement and the specified angle.

8 Claims, 8 Drawing Sheets

METHOD FOR DETECTING THE COORDINATE POSITION OF THE GRINDING POINT OF A GRINDING WHEEL AND RELATED DEVICE

BACKGROUND OF THE INVENTION

The present invention relates to a method for detecting the coordinate position for the grinding point of a grinding wheel in a grinding machine with a swiveling table and the related device thereof.

An example of a conventional grinding machine having a swiveling table is described hereinafter with reference to FIG. 12.

Workpiece [W] is supported by a spindle head (not shown in the drawing) which is arranged on a table (not shown in the drawing) and rotatably driven about an axis parallel to the Z-axis which is the travel direction of the aforesaid table. A wheel head comprises a feed table (not shown in the drawing) that is movable in the X-axis direction perpendicular to the Z-axis direction, and a swiveling table 13 mounted on the feed table to be turned about a vertical axis relative to the aforesaid feed table. The swiveling table 13 supports an external grinding wheel Ga through a wheel spindle 22 which is rotated about an horizontal axis. Swiveling table 13 is drivably turned by a numerically controlled (NC) servomotor not shown in the drawing.

For example, in the setup operation for taper grinding, swiveling table 13 is rotated counterclockwise only through a taper angle $\theta_G$ extending from a reference position wherein the rotational axis of external grinding wheel Ga is parallel to the Z-axis, as indicated by the solid line in the drawing, to a set position indicated by the broken line in the drawing. At this time, the grinding point of external grinding wheel Ga travels a distance $Z_0$ in the Z-axis direction and a distance $X_0$ in the X-axis direction to arrive at point $A_0$.

Accordingly, when the distance between the center of swiveling table 13 and the grinding point of grinding wheel Ga is designated $R_G$, the displacements of $Z_0$ and $X_0$ are calculated based on the aforesaid distance $R_G$ and the turning angle $\theta_G$ of swiveling table Ga, so as to make the necessary positional corrections for said table and grinding wheel. Thus, the aforesaid data $R_G$ and $\theta_G$ expressing the position of the grinding wheel point must be calculated by some method and must be previously stored in memory, as parameters.

The values or $R_G$ and $\theta_G$ expressing the position of the grinding point of external grinding wheel Ga can be obtained from the blueprint of the grinding machine. Inasmuch as the actual position and theoretical position of the grinding point of external grinding wheel Ga may differ due to machining errors or assembly errors during assembly of the machine, it is difficult to precisely measure the actual position of said grinding point.

SUMMARY OF THE INVENTION

An object of the present invention is to provide a method for precisely detecting the coordinate position of the grinding point of a grinding wheel with respect to the swivel axis of a swiveling table which supports the grinding wheel and is swivelled about the swivel axis.

A further object of the present invention is to provide a device for detecting the coordinate position of the grinding point of a grinding wheel that is capable of precise and rapid grinding point coordinate position calculations based only on the displacement of the grinding point in single direction as measured by a displacement measuring means, and a specific swibelling angle.

The aforesaid objects are accomplished by the present invention which provides a method for detecting the coordinate position of the grinding point of a grinding wheel using the swive axis of a drivably rotated swiveling table as the origin point in a grinding machine having a work table, a feed table, a feed mechanism for changing the relative positions of said work table and feed table in a first direction and a second direction intersecting said first direction, and a swiveling table drivably rotated about the swivel axis perpendicular to the feed plane of the aforesaid feed table with a grinding wheel drivably rotated about an axis parallel to the aforesaid plane.

The method comprises a step for turning the aforesaid swiveling table from a start position through a specified angle so as to arrive at a first turning position a step for measuring a first displacement in selected one of the first and second directions of the grinding point of the grinding wheel from the aforesaid start position; a step for turning said swiveling table from the first turning position through the aforesaid specified angle only so as to arrive at a second turning position; a step for measuring a second displacement in the selected direction of the grinding point of the grinding wheel from the first turning position; and a step for calculating the coordinate position of the grinding point of the grinding wheel based on said first and second displacements and the aforesaid specified angle.

In short, in the method of the present invention for detecting the coordinate position of the grinding point of a grinding wheel, a swiveling table is turned from a start position through a specified angle and a first displacement in the direction of travel of the grinding point of the grinding wheel or displacement perpendicular to said direction of travel is measured, and then the swiveling table is turned through a specified angle in the same direction and a second displacement is measured. After that, the coordinate position of the grinding point of a grinding wheel with respect to the swivel axis of the swiveling table is a calculated based on the aforesaid first and second displacements and the aforesaid specified angle, with this method, the position of the grinding point of the grinding wheel can be measured accurately.

Other and further objects, features and advantages of the invention will become more fully apparent from the following description.

BRIEF DESCRIPTION OF THE DRAWINGS

FIG. 1 shows a plan view of the complete control circuitry for a grinding machine.

FIGS. 2 through 6 show a first embodiment of the invention. FIG. 2 is a plan view showing the swiveling table and external grinding wheel of the previously described grinding machine.

FIG. 3 is a flow chart showing the sequence for detecting the coordinate position of the grinding point of the external grinding wheel.

FIG. 4 is a plan view showing the external grinding wheel and dial gauge.

FIG. 5 is an illustration of the calculations to determine the position of the grinding point of the external grinding wheel based on the first and second displacements and the specified angle.

FIG. 6 is an illustration showing the corrections made when an arc is formed around the grinding point of the external grinding wheel.

FIGS. 7 through 11 show a second embodiment of the invention. FIG. 7 is a plan view showing the swiveling table and angular grinding wheel of the previously described grinding machine.

FIG. 8 is a plan view showing the angular grinding wheel and dial gauge.

FIG. 9 is a flow chart showing the sequence for detecting the coordinate position of the grinding point of the angular grinding wheel.

FIG. 10 is an illustration of the calculations to determine the position of the grinding point of the angular grinding wheel based on the first and second displacements and the specified angle.

FIG. 11 is an illustration showing the corrections made when an arc is formed around the grinding point of the angular grinding wheel.

DETAILED DESCRIPTION OF THE PREFERRED EMBODIMENTS

First Embodiment

Figure 1:
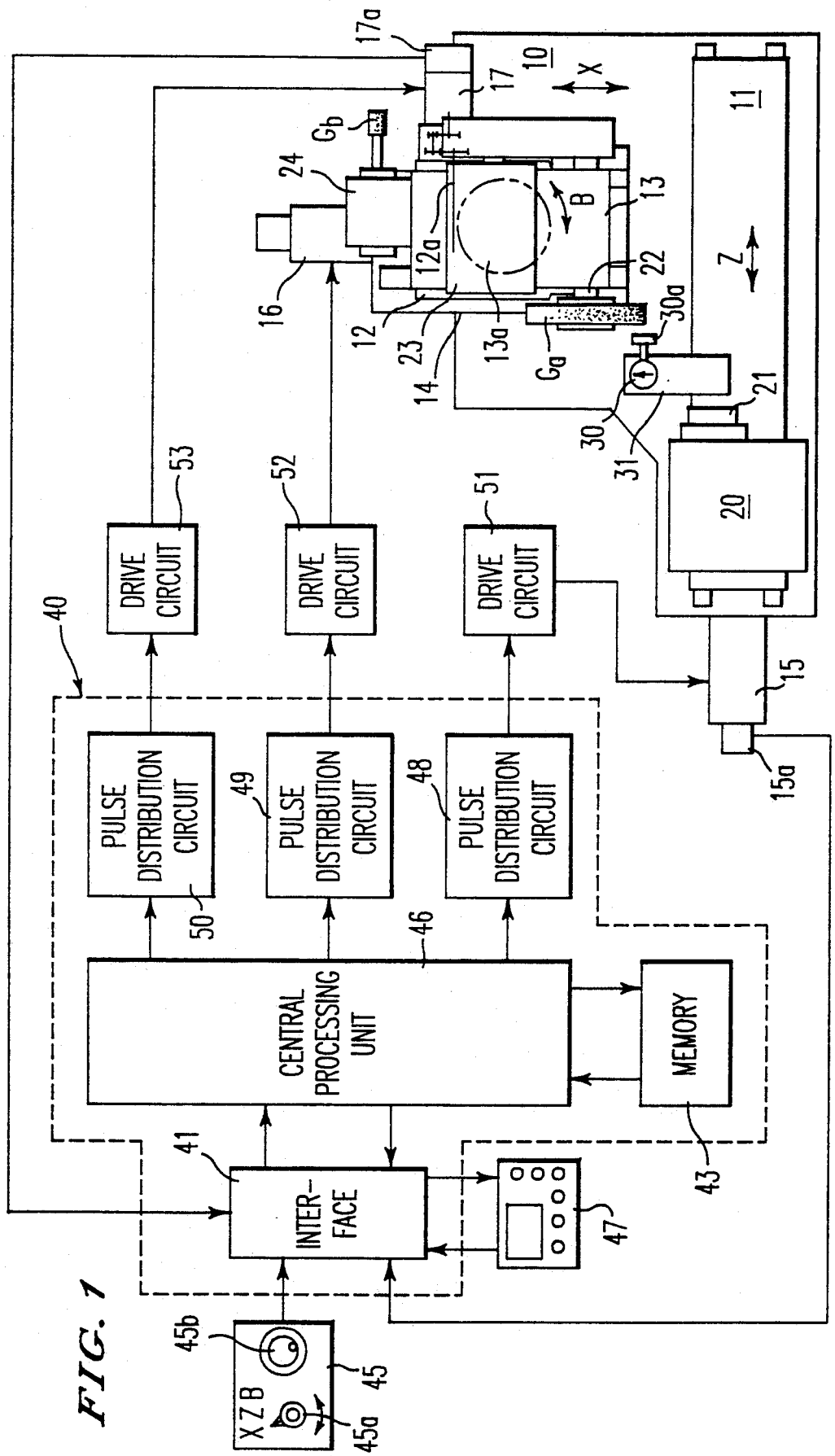
FIGS. 1 through 11 show embodiments of the present invention.

A first embodiment of the present invention is described hereinafter with reference to FIG. 1 which illustrates a grinding machine having a swiveling table.

A work table 11 disposed on bed 10 is guided so as to be movable in the horizontal Z-axis direction. Dial gauge 30 is installed on work table 11 with bracket 31. Dial gauge 30 measured in units of 0.001 mm, and the tip 30a of gauge 30 has a flat face perpendicular to the Z-axis and is retractable in the Z-axis direction. Dial gauge 30 constitutes a displacement measuring means by itself or together with a current position counter for the Z-axis and a manual feed control panel which are described later. Further, a feed table 12 disposed on bed 10 is movably guided in the horizontal X-axis direction which is perpendicular to the Z-axis direction. A swiveling table 13 disposed on feed table 12 is rotatably supported about a vertical swivel axis. Wheel head 14 comprises the aforesaid feed table 12 and swiveling table 13. When work table 11 is fixedly mounted on bed 10, wheel head 14 may travel in both the Z-axial and X-axial directions. Work table 11 travels in the Z-axis direction by means of servomotor 15 which has a rotary encoder 15a connected thereto. Feed table 12 travels in the X-axis direction by means of servomotor 16. Swiveling table 13 is drivably turned by servomotor 17 through a gear reducing means containing a worm gear 12a and a worm wheel 13a. A rotary encoder 17a is connected to servomotor 17.

Spindle head 20 is arranged on work table 11 so that a workpiece not shown in the drawing is gripped by chuck 21 attached to the main spindle of spindle head 20, and said workpiece is rotatably driven around the rotational axis of the main spindle parallel to the Z-axis.

Wheel spindle 22 is rotatably supported on swiveling table 13, and an external grinding wheel Ga is removable mounted to one end of said wheel spindle 22 which is rotatably driven by a grinding wheel drive motor 23. Wheel spindle 22 and the axis of rotation of motor 23 are set at equal height. An internal grinding wheel drive motor 24 is mounted at the rear end of swiveling table 13, and an internal grinding wheel Gb is removably attached to said internal grinding wheel motor 24.

Numerical control device 40 comprises an interface 41, memory 43, central processing unit (CPU) 46, and pulse distribution circuits 48, 49 and 50. A control panel 47 with a cathode ray tube (CRT) is connected to interface 41. Control panel 47 provides buttons for inputting various data for processing programs and processing conditions. The control panel 47 further provides buttons designated for [return to origin position] operation, and [position memorizing] operation. CPU 46 has connected thereto the aforesaid interface 41, memory 43, and pulse distribution circuits 48, 49 and 50. Rotation detection signals from rotary encoders 15a and 17a are input to CPU 46 through interface 41, and a manual feed control panel 45 is also connected to said interface 41. Drive circuits 51, 52 and 53 are connected to pulse distribution circuits 48, 49 and 50, respectively. Servomotors 15, 16 and 17 are connected to the aforesaid drive circuits 51, 52 and 53, respectively.

The Read Only Memory (ROM) area of memory 43 stores programs for calculating the coordinate positions of the grinding point of external grinding wheel Ga and internal grinding wheel Gb as well as other control programs. Further, the Random Access Memory (RAM) area of memory 43 stores measurement data obtained from dial gauge 30 and input through operation panel 47, the specified turning angle of the swivel table, and the radius of the arc formed around the grinding point of the grinding wheel. The RAM area also includes current position counters 43a, 43b and 43c that detect the current positions of work table 11, feed table 12 and swiveling table 13, the data of said counters being updated in accordance with the movement of said work table 11 and feed table 12 and the turning of swiveling table 13. In the First Embodiment, dial gauge 30, manual feed operation panel 45 and current position counter 43b constitute the displacement measuring means for measuring displacement of the grinding point of the grinding wheel in the Z-axis direction.

A description of the coordinate position of the grinding point of the grinding wheel follows hereinafter with reference to FIG. 2.

Figure 2:
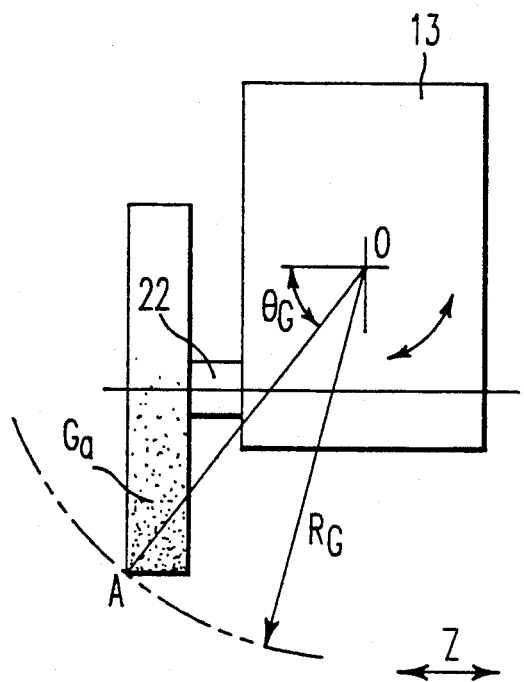

FIG. 2 is a plan view showing the swiveling table 13 of FIG. 1. The drawing shows the state wherein wheel spindle 22 of external grinding wheel Ga is at the reference position parallel to the Z-axis. In the present invention, the coordinate position of point [A], which is the grinding point of external grinding wheel Ga, is detected with respect to the origin point of a coordinate system on swiveling table 13. Origin point [0] is the swivel axis of swiveling table 13, and is of an equal height with wheel spindle 22. The coordinate position is expressed as polar coordinates by the distance $R_o$ between point [0] and point [A] and the angle $\theta_c$ between a line connecting points [0] and [A] and a line perpendicular to the Z-axis.

Figure 3:
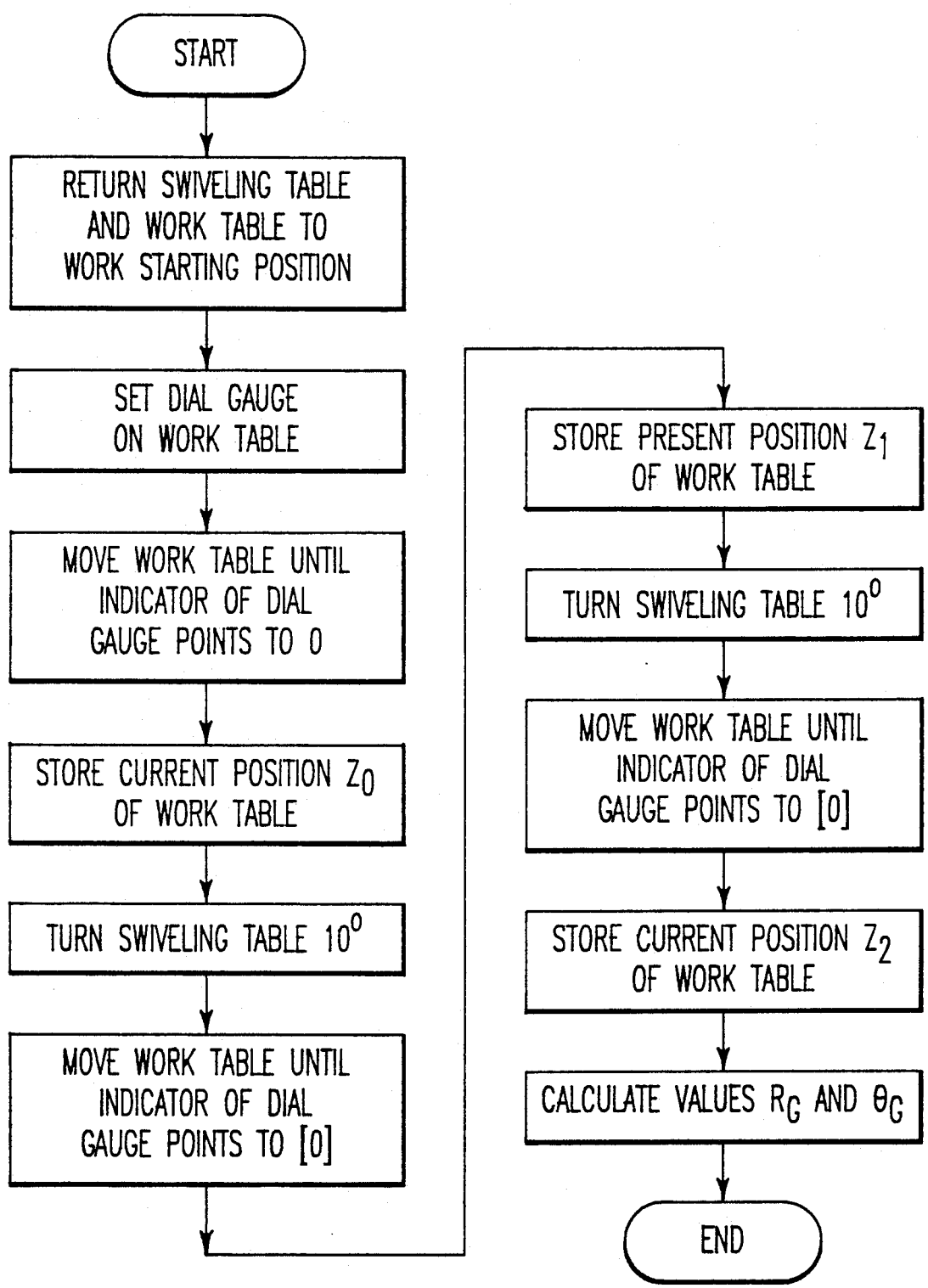

The sequence for determining the coordinate position of the grinding point of the grinding wheel is described hereinafter. FIG. 3 is a flow chart showing the aforesaid sequence.

Figure 4:
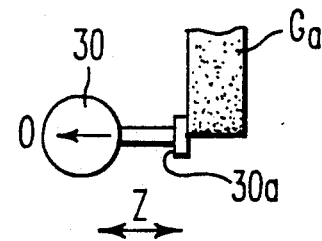
Figure 5:
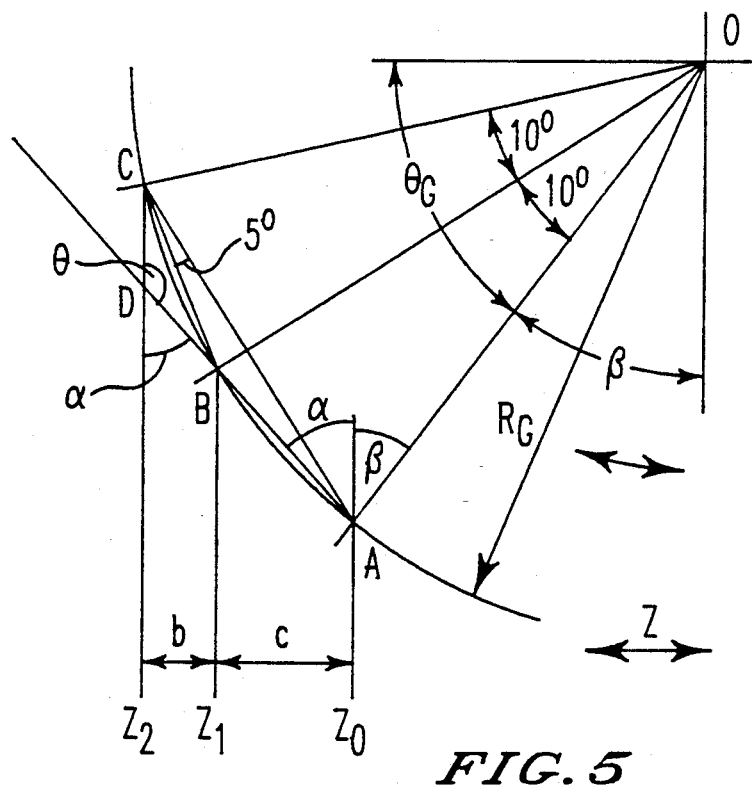

First, the [return to origin position] button on control panel 47 is depressed to actuate numerical control device 40 to start the pulse distribution to drive circuits 51, 52 and 53 so as to return the swiveling table 13 and work table 11 shown in FIG. 1 to the work starting position, to wit, the aforesaid reference position. At that time, the rotational axis of wheel spindle 22 is set parallel to the Z-axis. Next, dial gauge 30 is set on work table 11, as shown in FIG. 1. After switch 45a on manual feed control panel 45 is switched to the [Z] selection, pulse generator dial 45b is turned by an operator in the specified direction to actuate numerical control device 40 to start pulse distribution to drive circuit 51. The aforesaid operation causes work table 11 to move rightward, in FIG. 1 thereby causing tip 30a of dial gauge 30 to make contact with the side of external grinding wheel Ga, work table 11 is further moved rightward until the indicator of dial gauge 30 points to [0], as shown in FIG. 4. In the following explanation, it is presumed that the grinding point of external grinding wheel Ga is squared without forming an arced portion. Next, the current position $Z_o$ of work table 11 in FIG. 4 is stored in memory 43 by operating [position memorizing] button provided on control panel 47. After switch 45a is set at the [B] selection, pulse generator dial 45b is turned in the specified direction to start pulse distribution for the B-axis. Swiveling table 13 is turned clockwise through a specified angle of 10°, and arrives at a first turning position. At this time, the grinding point of external grinding wheel Ga travels leftward in the Z-axis direction from point [A] and arrives at point [B], as shown in FIG. 5, and the indicator of dial gauge 30 moves from the [0] position. Subsequently, the manual feed control panel 45 is again operated to move work table 11 leftward until the indicator of dial gauge 30 points to the [0] position again. Then, the present position $Z_1$, of work table 11 is stored in memory 43 by actuating the [position memorizing] button. A first displacement value [a] corresponds to the resultant quantity of an expression $Z_1$-$Z_o$. Next, swiveling table 13 is rotated clockwise 10° until it reaches a second turning position. At this time, the grinding point of external grinding wheel Ga travels leftward in the Z-axis direction from point [B] and arrives at point [C], as shown in FIG. 5, whereupon the indicator of dial gauge 30 moves from the [0] position. Work table 11 then is moved leftward until the indicator of dial gauge 30 points to the [0] position again. The current position $Z_2$ of work table 1 then is stored in memory 43. A second displacement value [b] corresponds to the resultant quantity of an expression $Z_2$-$Z_1$. The values $R_c$ and $\theta_c$ then are calculated from the first and second displacements values [a] and [b] and the specified angle of 10°.

In the previously described sequence, the positional change in the Z-axis direction of the grinding point of external grinding wheel Ga is detected by the change in the current position of work table 11 each time work table 11 is moved to return the indicator of dial gauge 30 to the [0] position at the first and second turning positions. However, after installing dial gauge 30, work table 11 may be fixed in place when said dial gauge 30 is initially set at [0], and subsequent positional changes may be read as is by the indicator dial of dial gauge 30. In such a case, dial gauge 30 is set above work table 11 so as to make the travel direction of the tip 30a of dial gauge 30 parallel to the travel direction of work table 11.

The calculations for determining $R_c$ and $\theta_c$ based on the previously described first and second displacements values [a] and [b] and the specified angle 10° are described hereinafter with reference to FIG. 5.

First, triangle $\triangle OAB$ is an isosceles triangle wherein:

$$\angle OAB = \angle OBA = (180° - 10°)/2 = 85°$$

and similarly, in $\triangle OBC$, $$\angle OBC = \angle OCB = 85°$$

such that $\triangle OAB$ and $\triangle OBC$ are congruent triangles wherein side $\overline{AB} = \overline{BC}$ (1)

Accordingly, triangle $\triangle ABC$ is an isosceles triangle wherein:

$$\angle ABC = (180° - 85°) \times 2 = 170°$$

$$\angle BAC = \angle BCA = (180° - \angle ABC)/2 = 5°, \text{ and}$$

$a:b = \overline{AB}:\overline{BD}$, such that $$\overline{BD} = \overline{AB} \cdot b/a \quad (2)$$

In $\triangle BCD$, $\angle CBD = 180° - \angle ABC = 10°$, therefore, $CD = (BC^2 + BD^2 - 2 \cdot BC \cdot BD \cdot \cos 10°)^{\frac{1}{2}}$, and from Equations 1 and 2 the following is derived:

$$CD = (\overline{AB}^2 + \overline{AB}^2 \cdot b^2/a^2 - 2 \cdot \overline{AB} \cdot \overline{AB} \cdot b/a \cdot \cos 10°)^{\frac{1}{2}} = \overline{AB}(1 + b^2/a^2 - 2 \cdot b/a \cdot \cos 10°)^{\frac{1}{2}} \quad (3)$$

From $\overline{BC}/\sin \angle CDB = CD/\sin \angle CBD$ is derived:

$$\sin \angle CDB = (\overline{BC} \cdot \sin \angle CBD/\overline{CD} = (\overline{BC} \cdot \sin 10°)/\overline{CD},$$

and from Equations 1 and 3 is derived:

$$\sin \angle CDB = \sin 10°/(1 + b^2/a^2 - 2 \cdot b/a \cdot \cos 10°)^{\frac{1}{2}}.$$

If $\angle CDB$ is designated $\theta$, then
$[\sin 10°/(1 + b^2/a^2 - 2 \cdot b/a \cdot \cos 10°)^{\frac{1}{2}}]$ and in the vicinity of point [D], $\alpha = 180° - \theta$, and $\alpha + \beta = 85°$, such that $\beta = 85° - (180° - \theta) = \theta - 95°$, and $\theta_G = 90° - \beta = 90° - (\theta - 95°) = 185° - \theta$, from which is derived the following expressions:

$$\theta_G = 185° - \sin^{-1}(\sin 10°/(1 + b^2/a^2 - 2 \cdot b/a \cdot \cos 10°)^{\frac{1}{2}}) \quad (4)$$

Since $a = R_G \cos(\theta_G - 10°) - R_G \cos \theta_G$, therefore $R_G = a/[\cos(\theta_G - 10°) - \cos \theta_G] \quad (5)$ The values $\theta_c$ and $R_c$ are obtained by substituting the first and second displacement values [a] and [b] in Equations 4 and 5. Corrections for the first and second displacement values [a] and [b] when an arc is formed around the grinding point of external grinding wheel Ga are described hereinafter with reference to FIG. 6.

Figure 6:
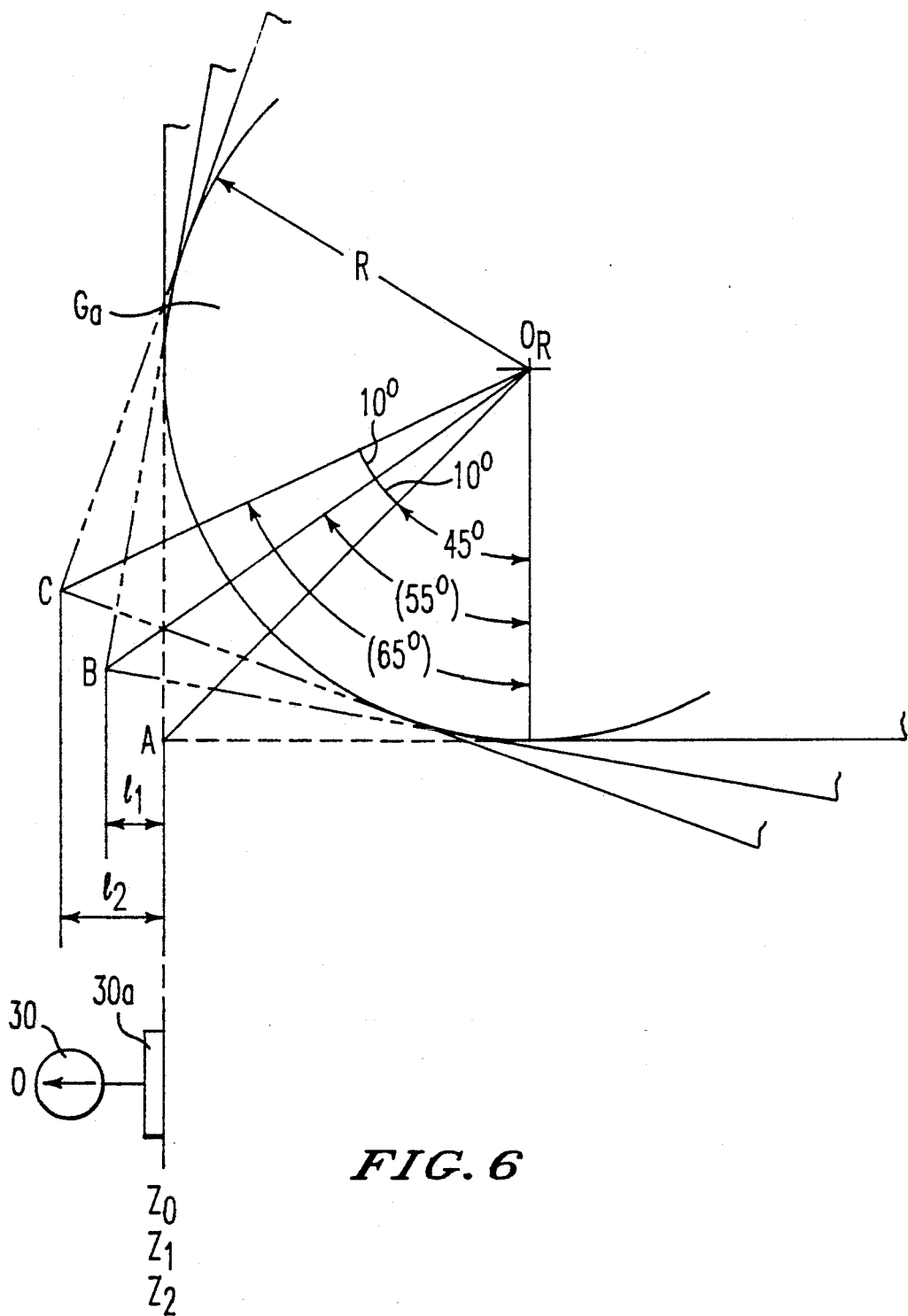

FIG. 6 shows an enlargement of the periphery around the grinding point of external grinding wheel Ga. An arc having a radius [R] is formed around the grinding point. The ideal vertex of external grinding wheel Ga when swiveling table 13 is at the reference position is designated point [A], an ideal vertex when turning 10° clockwise using are center $O_w$ as reference is designated point [B], and an ideal vertex when turning another 10° is designated point [C]. Since the tip 30a of dial gauge 30 normally traces an arc of radius [R], an error l1 is generated at the first turning position and an error l2 is generated at the second turning position. Since $O_w A = O_R B = O_R C = R \cos 45°$, $$l1 = (R/\cos 45°) \cdot \sin 55° - R$$

$$l2 = (R/\cos 45°) \cdot \sin 65° - R$$

Accordingly, the first displacement value [a] is corrected relative to $Z_1 - Z_o$ as follows:

$$a = (Z_1 + l1) - Z_o = (Z_1 - Z_o) + (R/\cos 45°) \cdot \sin 55° - R;$$

and the second displacement value [b] is corrected relative to $Z_2 - Z_1$ as follows:

$$b = (Z_2 + l2) - (Z_1 + l1) = (Z_2 - Z_1) + (l2 - l1) = (z_2 - Z_1) + (R/\cos 45°) \cdot (\sin 65° - \sin 55°)$$

The coordinate positions of the grinding point (corresponding to points A, B and C) of the grinding wheel are detected by calculations based on the corrected first and second displacement values and specified angle.

Second Embodiment

Figure 7:
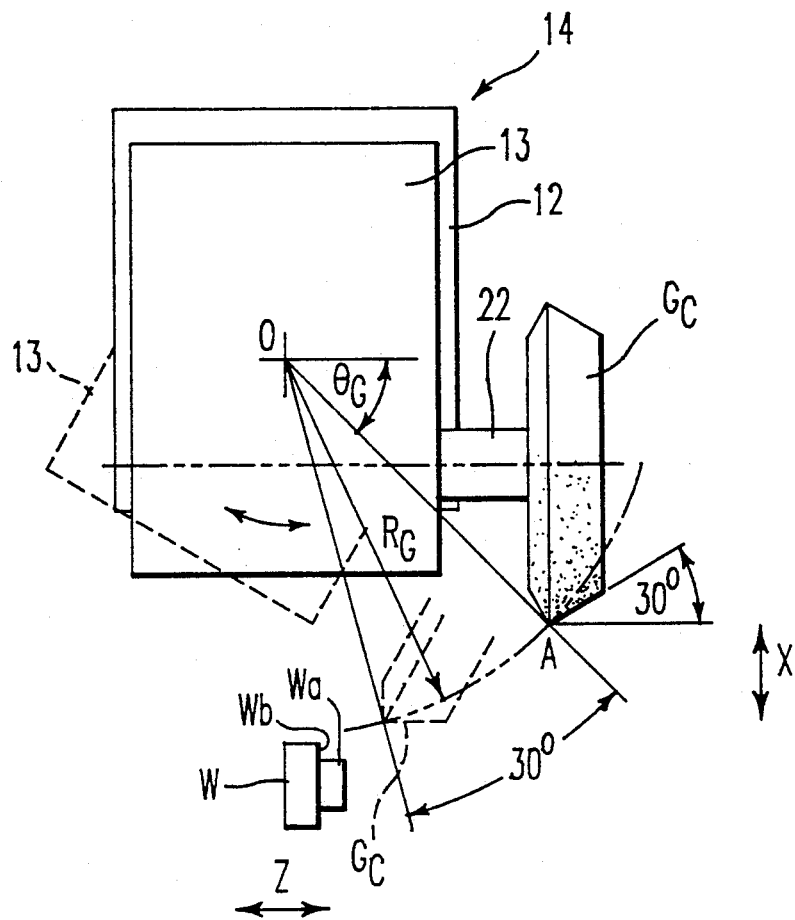
Figure 8:
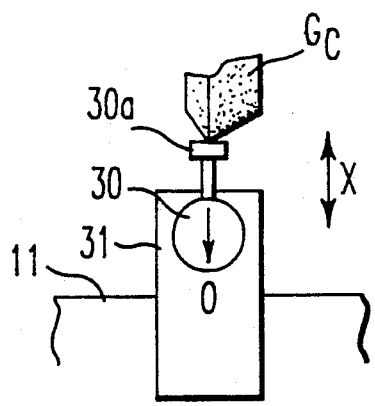

A second embodiment of the present invention is described hereinafter. The second embodiment provides a 30° angular grinding wheel $G_c$ attached to swiveling table 13, as shown in FIG. 7. Dial gauge 30 is mounted to the top of work table 11 by means of bracket 31, as shown in FIG. 8. Dial gauge 30 has a tip 30a with a flat surface perpendicular to the X-axis, which is retractable along the said X-axis. The construction of the grinding machine of the second embodiment is identical to that of the first embodiment with the exception of the aforesaid points. Before grinding operations, swiveling table 13 turns clockwise 30° from the reference position indicated by the solid line where rotating shaft 22 is parallel to the Z-axis to the state indicated by the broken line so the outer diameter [Wa] or workpiece [W] and flange face [Wb] can be ground. Coordinate position of the point [A] which is the grinding point of angular grinding wheel $G_c$ is detected with respect to the swivel axis of swiveling table 13. Origin [0] is the swivel axis of swiveling table 13 and is equal in height with wheel spindle 22. The coordinate position of the grinding point is expressed as polar coordinate $R_o$, which is the distance between point [A] and point [0], and angle $\theta_c$ between a straight line connecting point [A] and [0] and a line pallarel to the Z-axis.

Figure 9:
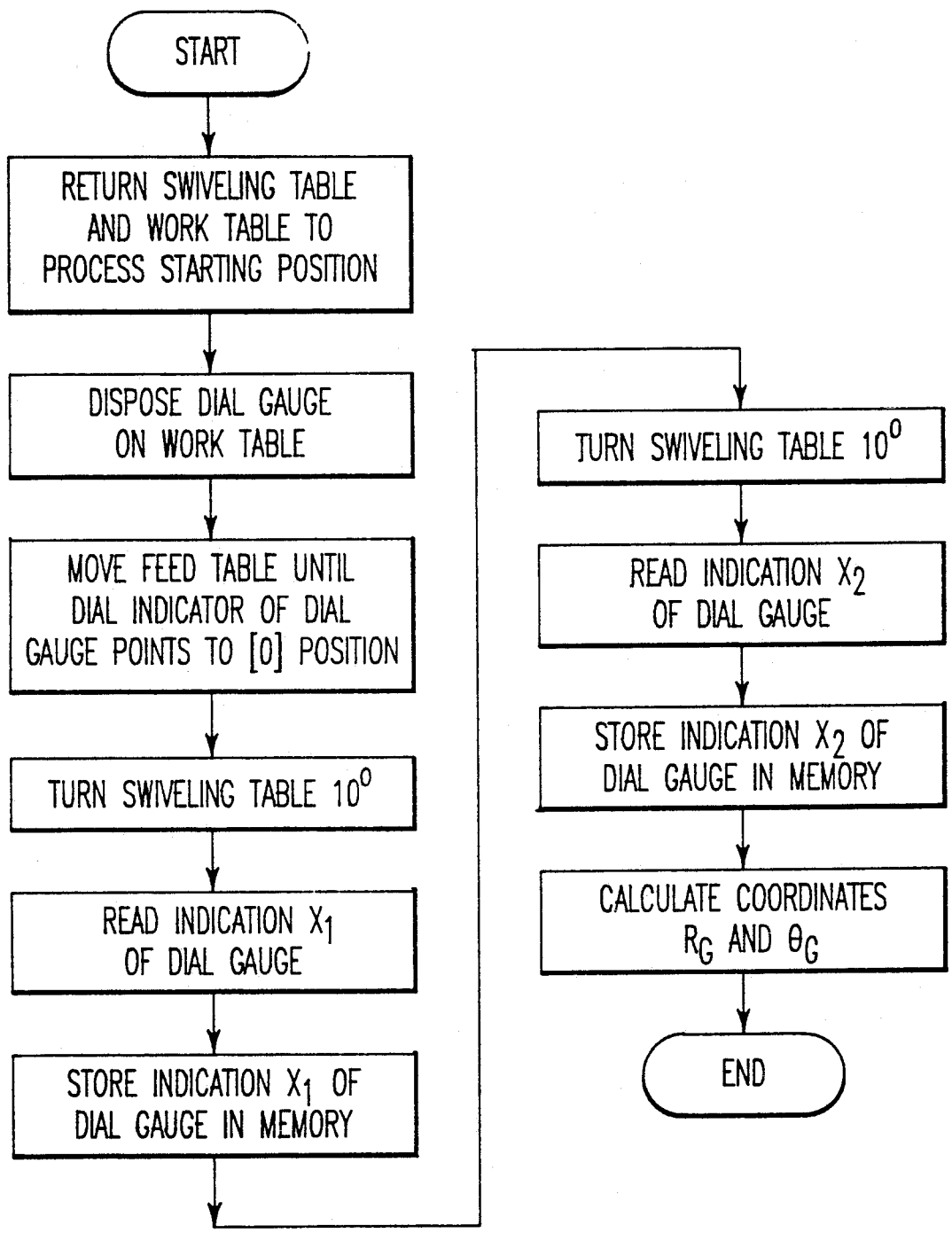

The sequence for determining the coordinate position of the grinding point of angular grinding wheel $G_c$ is described hereinafter with reference to FIG. 9 which shows a flow chart of the sequence.

Figure 10:
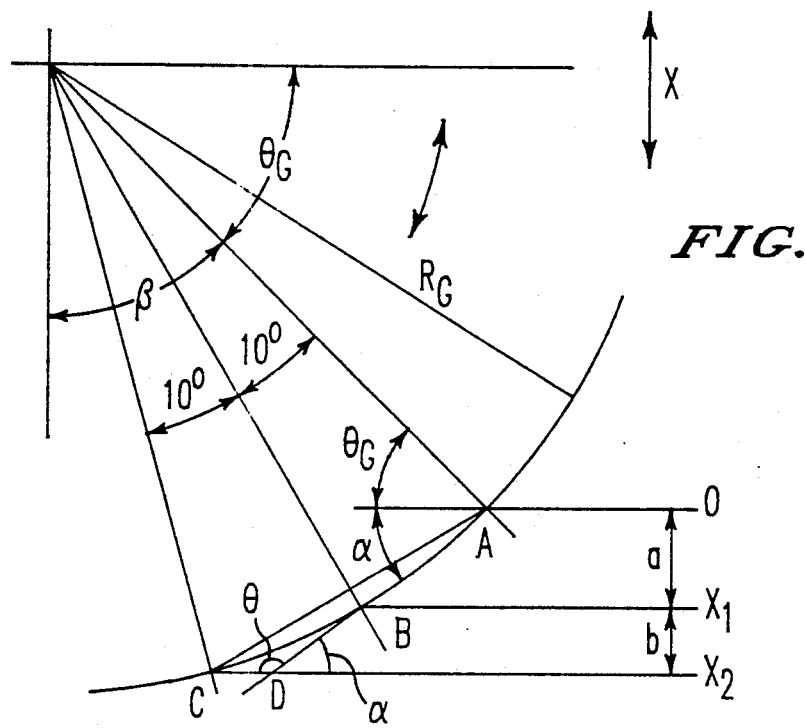
Figure 12:
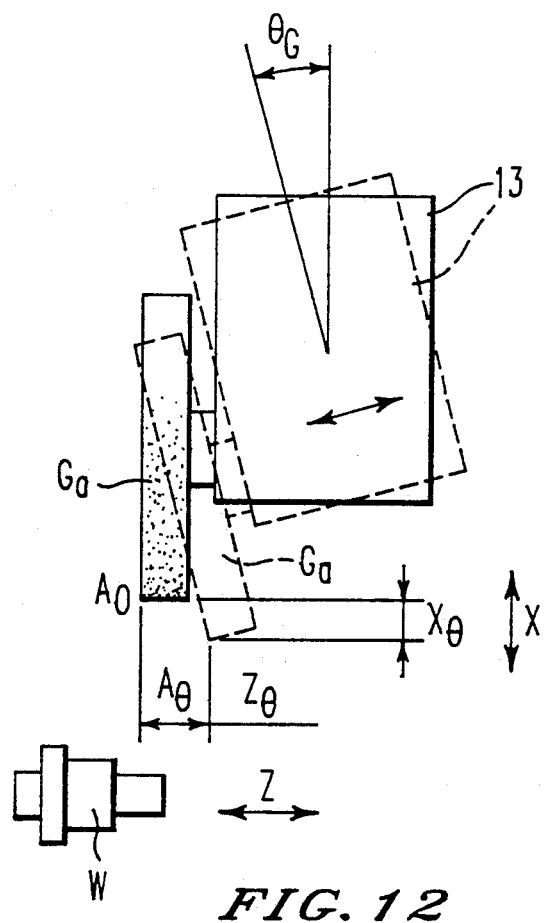
FIG. 12 is a plan view showing the swiveling table and external grinding wheel of a conventional grinding machine.

First, swiveling table 13 and work table 11 are returned to the machining starting position, to wit, the reference position. Dial gauge 30 is disposed on work table 11. Pulse generating dial 45b is operated after switch 45a on manual feed control panel 45 is set to the X-axis position, thereby moving feed table 13 toward work table 11. As a result, the grinding point of angular grinding wheel $G_c$ makes contact with tip 30a of dial gauge 30, as shown in FIG. 8, and feed table 12 is further moved forward, as shown in FIG. 7, until the dial indicator of dial gauge 30 points to [0] position. In the following explanation, it is assumed that the grinding point of angular grinding wheel $G_c$ is squared without forming an arced portion. Next, swiveling table 13 is turned clockwise through the specified angle of 10° so as to arrive at a first turning position. At this time, the grinding point of angular grinding wheel $G_c$ travels forward along the X-axis from point [A] and arrives at point [B]. Indication X1 of dial gauge 30 is read and the data stored in memory by an operator. Indication X1 corresponds to the first displacement [a]. Then swiveling table 13 is turned clockwise 10° and arrive at a second turning position. At this time, the grinding point of angular grinding wheel $G_c$ travels forward in the X-axis direction from point [B] to point [C], as shown in FIG. 10. Then, indication X2 of dial gauge 30 is read and the data stored in memory. The second displacement value [b] corresponds to the resultant quantity of an expression X2-X1. Then, the coordinates $R_c$ and $\theta_c$ are calculated based on the first and second displacements values [a] and [b] and the aforesaid specified angle of 10°.

The previously described calculations are described hereinafter with reference to FIG. 10.

$$\angle OAB = \angle OBA = (180° - 10°)/2 = 85°$$

and similarly, in $\triangle OBC$, $$\angle OBC = \angle OCB = 85°$$

such that $\triangle OAB$ and $\triangle OBC$ are congruent triangles wherein $\overline{AB} = \overline{BC}$ \hfill (1)

Accordingly, triangle $\triangle ABC$ is an isosceles triangle wherein:

$$\angle ABC = (180° - 85°) \times 2 = 170°$$

$$\angle BAC = \angle BCA = (180° - \angle ABC)/2 = 5°, \text{ and}$$

$a:b = \overline{AB}:\overline{BD}$, such that $\overline{BD} = \overline{AB} \cdot b/a$ \hfill (2)

In $\triangle BCD$, $\angle CBD = 180° - \angle ABC = 10°$, therefore,
$\overline{CD} = (\overline{BC}^2 + \overline{BD}^2 - 2 \cdot \overline{BC} \cdot \overline{BD} \cdot \cos 10°)^{\frac{1}{2}}$,
and from Equations 1 and 2 the following is derived:

$$\overline{CD} = (\overline{AB}^2 + \overline{AB}^2 \cdot b^2/a^2 + 2 \cdot b/a \cdot \cos 10°)^{\frac{1}{2}} = \overline{AB}(1 + b^2 a^2 - 2 \cdot b/a \cdot \cos 10°)^{\frac{1}{2}} \quad (3)$$

From $\overline{BC}/\sin \angle CDB = \overline{CD} \sin \angle CBD$ is derived: $\sin \angle CDB = (\overline{BC} \cdot \sin \angle CBD)/\overline{CD} = (\overline{BC} \cdot \sin 10°)/\overline{CD}$, and from Equations 1 and 3 is derived:

$$\sin \angle CDB = \sin 10°/(1 + b^2/a^2 - 2 \cdot b/a \cdot \cos 10°)^{\frac{1}{2}}$$

If $\angle CDB$ is designated $\theta$, then $\theta = \sin^{-1} [\sin 10°/(1 + b^2 a^2 - 2 \cdot b/a \cdot \cos 10°)^{\frac{1}{2}}]$ and $\alpha = 180° - \theta$, and $\theta_G = 85° - \alpha$, $\theta_G = \sin^{-1} [\sin 10°/(1 + b^2/a^2 - 2 \cdot b/a \cdot \cos 10°)^{\frac{1}{2}}] - 95°$ \hfill (4)

Since $R_G \sin (\theta_G + 10°) - R_G \sin \theta_G = a$, the following expression is therefore obtained:

$$R_G = a/[\sin (\theta_G + 10°) - \sin \theta_G] \quad (5)$$

The values $\theta_c$ and $R_c$ are obtained by substituting the first and second displacement values [a] and [b] in Equations 4 and 5.

Corrections for the first and second displacements [a] and [b] when an arc is formed around the grinding point of angular grinding wheel $G_c$ are described hereinafter with reference to FIG. 11.

Figure 11:
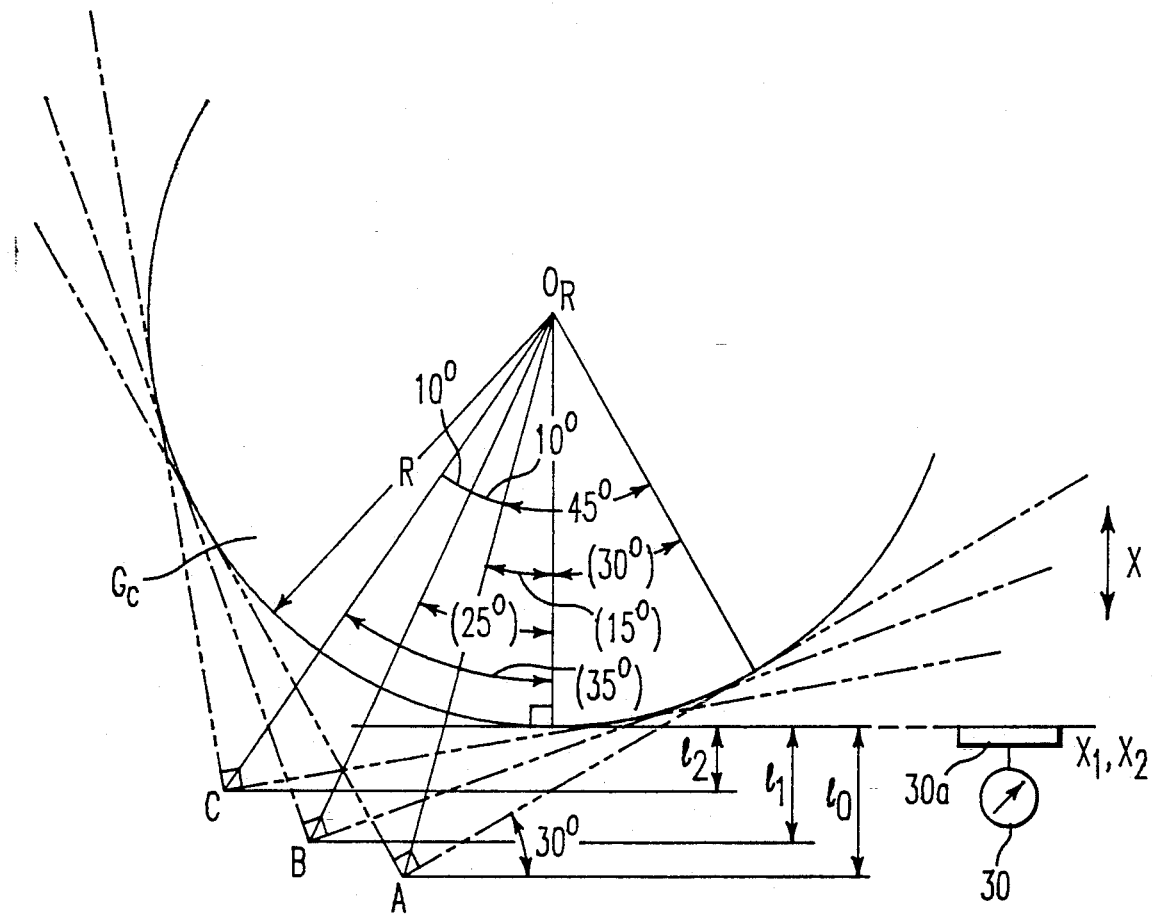

FIG. 11 shows an enlargement of the periphery around the grinding point of angular grinding wheel GC. An arc having a radius [R] is formed around the grinding point. The ideal vertex of angular grinding wheel $G_c$ when swiveling table 13 is at the reference position is designated point [A], an ideal vertex when turning 10° clockwise using arc center $O_R$ as reference is designated point [B], and an ideal vertex when turning another 10° is designated point [C]. Since the tip 30a of dial gauge 30 normally traces an arc of radius [R], an error l1 is generated at the first turning position and an error l2 is generated at the second turning position. Since $\overline{O_RA} = \overline{O_RB} = \overline{O_RC} = R/\cos 45°$, $$l0 = (R/\cos 45°) \cdot \cos 15° - R$$

$$l1 = (R/\cos 45°) \cdot \cos 25° - R$$

$$l2 = (R/\cos 45°) \cdot \cos 35° - R$$

Accordingly, the first displacement value [a] is corrected relative to $X_1$, as follows:

$$a = (X_1 + l1) - (0 + l0) = X_1 + (R/\cos 45°) \cdot (\cos 25° - \cos 15°);$$

and the second displacement value [b] is corrected relative to $X_2 - X_1$ as follows:

$$b = (X_2 + l2) - (X_1 + l2) = (X_2 - X_1) + (R/\cos 45°) \cdot (\cos 35° - \cos 25°)$$

Although the invention has been described in its preferred form with a certain degree of particularity, it is understood that the present disclosure of the preferred form has been changed in the details of construction and the combination and arrangement of parts may be resorted to without departing from the spirit and the scope of the invention hereinafter claimed.

What is claimed is:

1. A method for detecting the coordinate position of the grinding point of a grinding wheel in a grinding machine having a swiveling table supporting the grinding wheel, a work table, a feed table on which said swiveling table is rotatably mounted, and a feed mechanism for changing the relative positions of said work table and feed table in a first direction and a second direction intersecting said first direction, said method sequentially comprising:
    a step of turning said swiveling table about a swivel axis thereof from a start position through a specified angle only so as to arrive at a first turning position;
    a step of measuring a first displacement in a selected one of the first and second directions of the grinding point of the grinding wheel from the start position;
    a step of turning said swiveling table about said swivel axis from the first turning position through said specified angle only so as to arrive at a second turning position;
    a step of measuring a second displacement in said selected one of the first and second directions of the grinding point of the grinding wheel from the first turning position; and
    a step of calculating the coordinate position of the grinding point of the grinding wheel based on said first and second displacements and said specified angle.

2. A method for detecting the coordinate position of the grinding point of a grinding wheel in a grinding machine having a swiveling table supporting the grinding wheel, a work table linearly movable in a first direction, a feed table movable in a second direction perpendicularly to the first direction and supporting said swiveling table which is rotatable about said swivel axis and supports said grinding wheel, said method comprising the sequential steps of:
    providing a displacement measuring means to measure displacement of the grinding point of said grinding wheel in a selected one of the first and second directions,
    drivingly rotating said swiveling table about a swivel axis thereof from a start position through a specified angle only so as to arrive at a first turning position,
    measuring a first displacement in said selected direction of the grinding point of said grinding wheel from the start position by said displacement measuring means,
    drivingly rotating said swiveling table about the swivel axis from the first turning position through said specified angle only so as to arrive at a second turning position,
    measuring a second displacement in said selected direction of the grinding point of said grinding wheel from the first turning position by said displacement measuring means, and
    calculating the coordinate position of the grinding point of said grinding wheel based on said first and second displacements and said specified angle.

3. A device for detecting the coordinate position of the grinding point of a grinding wheel in a grinding machine having a swiveling table supporting the grinding wheel, a work table, a feed table, a feed mechanism for changing the relative positions of said work table and feed table in a first direction and a second direction intersecting said first direction, and said swiveling table drivably rotated about a swivel axis thereof perpendicular to the feed plane of the said feed table and supporting said grinding wheel through a grinding wheel shaft rotated about an axis parallel to the plane, said device comprising a displacement measuring means for measuring displacement of the grinding point of said grinding wheel in a selected one of said first direction or said second direction, a turning means for rotating the aforesaid swiveling table from a start position through a specified angle only so as to arrive at a first turning position and for rotating said swiveling table from the first displacement position through the aforesaid specified angle only so as to arrive at a second turning position, a memorizing means for storing a first displacement of grinding point of said grinding wheel from the start position to the first turning position measured by said displacement measuring means and for storing a second displacement of the grinding point of said grinding wheel from the first turning position to the second turning position measured by said displacement measuring means, and a computing means for calculating the coordinate position of the grinding point of said grinding wheel based on said first and second displacements and the aforesaid specified angle.

4. A device for detecting the coordinate position of the grinding point of a grinding wheel as claimed in claim 3 wherein said work table is fixedly mounted on a bed, and said feed table movable in both the first and second directions.

5. A device for detecting the coordinate position of the grinding point of a grinding wheel as claimed in claim 3 wherein said work table is movable on a bed in the first direction and the feed table is movable in the second direction.

6. A device for detecting the coordinate position of the grinding point of a grinding wheel as claimed in claim 5 wherein said grinding wheel is a cylindrical grinding wheel and said displacement measuring means measures displacement of the grinding point of said cylindrical grinding wheel in the first direction.

7. A device for detecting the coordinate position of the grinding point of a grinding wheel as claimed in claim 5 wherein said grinding wheel is an angular grinding wheel and said displacement measuring means measures displacement of the grinding point of said angular grinding wheel in the second direction.

8. A device for detecting the coordinate position of the grinding point of a grinding wheel as claimed in claim 3 wherein said calculating means corrects for errors produced in measurement in the aforesaid first turning position and second turning position which are produced due to the arcuate shape of the surface on which the grinding point of said grinding wheel is located.

* * * * *

UNITED STATES PATENT AND TRADEMARK OFFICE
CERTIFICATE OF CORRECTION

PATENT NO. : 5,224,050

DATED : June 29, 1993

INVENTOR(S) : Norio OHTA, ET AL

Page 1 of 3

It is certified that error appears in the above-indentified patent and that said Letters Patent is hereby corrected as shown below:

Column 1, line 36, delete "$Z_0$" and insert therefor --$Z_\theta$--.

Column 1, line 36, delete "$X_0$" and insert therefor --$X_\theta$--.

Column 1, line 37, delete "$A_0$" and insert therefor --$A_\theta$--.

Column 1, line 40, delete "$Z_0$" and insert therefor --$Z_\theta$--.

Column 1, line 41, delete "$X_0$" and insert therefor --$X_\theta$--.

Column 2, line 1, delete "swibelling" and insert therefor --swiveling--.

Column 3, line 33, delete "measured" and insert therefor --measures--.

Column 6, line 8, delete "$\angle ABC = (180°-85°)\times 2 = 170°$" and insert therefor --$\angle ABC = 85°\times 2 = 170°$--.

Column 6, line 19, delete "$CD = (BC^2+BD^2-2\cdot BC\cdot BD\cdot \cos 10°)^{1/2}$" and insert therefor --$\overline{CD} = (\overline{BC}^2+\overline{BD}^2-2\cdot \overline{BC}\cdot \overline{BD}\cdot \cos 10°)^{1/2}$--.

Column 6, line 22, delete "CD" and insert therefor --$\overline{CD}$--.

Column 6, line 25, delete "CD" and insert therefor --$\overline{CD}$--.

Column 6, line 32, after "then", insert --$\theta=\sin^{-1}$--.

UNITED STATES PATENT AND TRADEMARK OFFICE
CERTIFICATE OF CORRECTION

PATENT NO. : 5,224,050
DATED : June 29, 1993
INVENTOR(S) : Norio OHTA, ET AL

It is certified that error appears in the above-indentified patent and that said Letters Patent is hereby corrected as shown below:

Column 6, line 40, delete "(sin10°/" and insert therefor --[sin10°/--.

Column 6, line 58, delete "$O_w$" and insert therefor --$O_R$--.

Column 6, line 64, delete "$O_w A$" and insert therefor --$O_R A$--.

Column 6, line 64, delete "Rcos45°" and insert therefor --R/cos45°--.

Column 8, line 27, delete "∠ABC =(180° -85°)x2=170°" and insert therefor --∠ABC =85°x2=170°--.

Column 8, line 35, delete "$-2\cdot(\overline{BC}\cdot\overline{BD}\cdot COS\ 10°)^{1/2}$" and insert therefor -- $-2\cdot\overline{BC}\cdot\overline{BD}\cdot COS\ 10°)^{1/2}$--.

Column 8, line 37, delete "$(\overline{AB}^2+\overline{AB}^2\cdot b^2/a^2+2\cdot b/a\ \cdot\ COS\ 10°)^{1/2}$" and insert therefor -- $(\overline{AB}^2+\overline{AB}^2\cdot b^2/a^2-2\cdot \overline{AB}\cdot\overline{AB}\cdot b/a\cdot COS\ 10°)^{1/2}$--.

Column 8, line 38, delete "$(1+b^2\ a^2-2\cdot b/a\cdot COS\ 10°)^{1/2}$" and insert therefor -- $(1+b^2/a^2-2\cdot b/a\cdot COS\ 10°)^{1/2}$--.

UNITED STATES PATENT AND TRADEMARK OFFICE
CERTIFICATE OF CORRECTION

PATENT NO. : 5,224,050
DATED : June 29, 1993
INVENTOR(S) : Norio Ohta, et al

It is certified that error appears in the above-indentified patent and that said Letters Patent is hereby corrected as shown below:

Column 8, line 47, delete "$(1+b^2\ a^2-2 \cdot b/a \cdot COS\ 10°)^{1/2}$" and insert therefor --$(1+b^2/a^2 -2 \cdot b/a \cdot COS\ 10°)^{1/2}$--.

Signed and Sealed this

Twelfth Day of April, 1994

Attest:

BRUCE LEHMAN

Attesting Officer

Commissioner of Patents and Trademarks